UNITED STATES PATENT OFFICE.

CHARLES EUGÈNE GASSMANN, OF MULHOUSE, GERMANY, ASSIGNOR TO LA SOCIÉTÉ CHIMIQUE DES USINES DU RHÔNE, ANCIENNEMENT GILLIARD, P. MONNET ET CARTIER, OF LYONS, FRANCE.

SOLUTION OF PHTHALEIN IN PHENOL.

SPECIFICATION forming part of Letters Patent No. 643,265, dated February 13, 1900.

Application filed December 24, 1897. Serial No. 663,403. (No specimens.)

*To all whom it may concern:*

Be it known that I, CHARLES EUGÈNE GASSMANN, of Mulhouse, Alsace, Germany, have invented certain new and useful Improvements in the Fixing on Fabrics of the Coloring-Matters known as "Phtaleins," of which the following is a specification.

It is well known to chemists that certain phenols—to wit, true phenols and phenolic ethers—are volatile with steam. I have discovered that said volatile phenols are excellent solvents for the dyes or coloring-matters known as "phtaleins," some of which, and in particular dialkyl rhodamin, are insoluble or only slightly soluble in aqueous liquids, and that the solutions obtained in this way, when thickened, printed, and the solvent volatilized with steam, may be fixed like the solutions of soluble coloring-matters with or without mordants and give shades exceedingly fast and tones the most varied. By virtue of this new process the phtaleins hitherto thought to be so insoluble that their employment was a matter of difficulty or impossibility can be readily utilized, both for printing and dyeing. The said volatile phenols have no other effect on the said coloring-matters than that of dissolving them. I have applied these solvents to fixing the said coloring-matters without mordant by simply printing or dyeing fabrics with the phenolic solution containing a thickening agent, fixing by steam, washing, and soaping.

In the category of coloring-matters to which my invention is applicable may be mentioned rhodamins of either the phtalic acid or succinic acid series, in particular dialkyl rhodamin, anisolins, or ultra-alkylated rhodamins, and the like. The mixture may be obtained by heating the dyestuff to be used in a phenoloid body at a temperature not exceeding the boiling-point of the solvent and so regulated that no chemical action takes place between the coloring-matter and the phenoloid body.

Among the said volatile phenols which are suitable for the purpose of my invention are phenol, (carbolic acid,) cresols, (cresylic acid,) and their ethers.

I give the following example as the general method of fixing a coloring-matter of the character hereinbefore referred to: Take ten parts of a twenty-per-cent. paste of dialkyl rhodamin in one of the solvents above mentioned and ten parts acetic acid. Add to it seven parts of solution of tannin in acetic acid (1:1) and seventy parts thickening agent. Print, steam for half an hour, fix in tartar emetic bath, wash, and soap.

I do not herein confine myself to the coloring-matters specifically mentioned, the action being general with regard to phtaleins. The proportions of the coloring-matters employed may be varied according to requirements.

What I claim, and desire to secure by Letters Patent, is—

1. As a new product for use in printing or dyeing fabrics, a phtalein dissolved in a volatile phenol.

2. As a new product for use in printing or dyeing fabrics, a phtalein dissolved in cresylic acid.

3. As a new product for use in printing or dyeing fabrics, a rhodamin dissolved in a volatile phenol.

4. As a new product for use in printing or dyeing fabrics a dialkyl rhodamin dissolved in a volatile phenol.

5. As a new product for use in printing or dyeing fabrics a rhodamin dissolved in cresylic acid.

6. As a new product for use in printing or dyeing fabrics, a dialkyl rhodamin dissolved in cresylic acid.

In witness whereof I have hereunto signed my name in the presence of two subscribing witnesses.

CHARLES EUGÈNE GASSMANN.

Witnesses:
EDWARD P. MACLEAN,
JOHN S. ABERCROMBIE.